(12) United States Patent
Ootsuka

(10) Patent No.: US 8,134,453 B2
(45) Date of Patent: Mar. 13, 2012

(54) RF COMMUNICATION SYSTEM

(75) Inventor: Kenji Ootsuka, Tokyo (JP)

(73) Assignee: SMK Corporation, Tokyo (JP)

( * ) Notice: Subject to any disclaimer, the term of this patent is extended or adjusted under 35 U.S.C. 154(b) by 1076 days.

(21) Appl. No.: 11/968,330

(22) Filed: Jan. 2, 2008

(65) Prior Publication Data

US 2008/0180271 A1 Jul. 31, 2008

(30) Foreign Application Priority Data

Jan. 25, 2007 (JP) ................... 2007-015440

(51) Int. Cl.
*G05B 11/01* (2006.01)
*G08C 19/16* (2006.01)

(52) U.S. Cl. ............... 340/12.22; 340/4.11; 340/12.28; 340/10.5; 455/352; 455/92; 341/176; 341/173

(58) Field of Classification Search .......... None
See application file for complete search history.

(56) References Cited

U.S. PATENT DOCUMENTS

| | | | |
|---|---|---|---|
| 5,799,241 A | 8/1998 | Matsubara et al. | |
| 2002/0102979 A1 | 8/2002 | Curley et al. | |
| 2003/0043053 A1* | 3/2003 | Schuckel | 340/825.69 |
| 2004/0127162 A1 | 7/2004 | Maki et al. | |
| 2006/0093018 A1 | 5/2006 | Chi | |

FOREIGN PATENT DOCUMENTS

| | | |
|---|---|---|
| AU | 763156 B2 | 7/2003 |
| JP | 08265823 | 10/1996 |
| JP | 2003-143665 A | 5/2003 |
| JP | 2004-031999 A | 1/2004 |
| JP | 2004-207986 A | 7/2004 |
| JP | 2005-198132 A | 7/2005 |
| JP | 2006-042069 A | 2/2006 |
| JP | 2006-042069 A | 2/2006 |
| JP | 2006278060 | 10/2006 |
| WO | 9959284 | 11/1999 |

OTHER PUBLICATIONS

Schawrz. FHSS vs DSSS. p. 3.*
Communication, European Patent Application No. 08000675.2 (May 6, 2008).

* cited by examiner

*Primary Examiner* — Daniel Wu
*Assistant Examiner* — John Bamert
(74) *Attorney, Agent, or Firm* — Edwards Wildman Palmer LLP; Peter C. Schechter; Brian R. Landry

(57) ABSTRACT

An RF communications system including a controlled apparatus configured to receive a RF signal transmitted from a remote control transmitter on a channel that the controlled apparatus can receive, without providing a response signal to the remote control transmitter. The RF transmitting circuit unit of the remote control transmitter transmits RF signals on all of a number of selected transmission channels in a wireless frequency band, while the RF receiving circuit unit of the controlled apparatus stands by to receive an RF signal on a channel of the selected channels that has a relatively low electric field intensity.

6 Claims, 8 Drawing Sheets

RF packet transmission format (Operation of a Conventional RF Communications System)

RF COMMUNICATION SYSTEM

CROSS-REFERENCE TO RELATED APPLICATION

The present application claims priority from under 35 U.S.C. §119 to Japanese Patent Application No. 2007-015440, filed Jan. 25, 2007, and which is hereby incorporated by reference herein in its entirety.

FIELD OF THE INVENTION

The present invention relates to an RF communications system that remotely controls a controlled apparatus via an RF signal that is transmitted from a remote control transmitter.

BACKGROUND OF THE INVENTION

Remote control of home appliances, such as air conditioners and televisions, generally makes use of infrared communications (IR communications), wherein an infrared control signal (IR signal) is transmitted from a remote control transmitter to the home appliance via infrared rays. However, wireless radio communications (RF communications) systems, wherein control data are carried on a radio frequency (RF) signal that is not constrained by the transmission direction and can be transmitted even if an object is interposed in the transmission path, has been drawing attention in recent years.

With an RF communications system, the remote control transmitter transmits an RF signal of a specified frequency that has been modulated with control data, after which a controlled apparatus inputs just the RF signal of a specified frequency by passing the reception signal through a bandpass filter, and then responds in accordance with the control data that are demodulated from the RF signal.

Here, the transmission channel of the RF signal transmitted from the remote control transmitter and the reception channel on which the controlled apparatus receives the RF signal are made to coincide with a channel of a common frequency band. However, because the communication environment changes, there are times when a fixed channel cannot be used. An RF communications system is known in the conventional art as described in Japanese Published Unexamined Patent Application No. H08-265823, which is incorporated by reference herein in its entirety. The RF communication system as described by the '823 Application adopts a multiscan access method wherein the transmitter that transmits the RF signal searches for a channel with low electric field intensity, notifies the receiver of that channel, and uses it as the common channel.

The procedure that uses a common channel as recited in the '823 Application will now be explained, referencing FIG. 9. The transmitter that is about to transmit an RF signal: retrieves the previously used channel (step S101); examines the electric field intensity of that channel (step S102); if the electric field is strong, determines that the channel is unavailable, adds an appropriate number of channels, and sets a new channel (step S103); and once again examines the electric field intensity of that channel (step S102). This procedure is performed repetitively until a channel with low electric field is obtained. At first, the previously used channel is retrieved because there is a strong possibility that, unless there has been a change in the communication environment, the frequency band of that channel has a weak electric field.

If a channel with a weak electric field is obtained, then the RF signal is transmitted to the receiver on that channel (step S104). Moreover, the receiver stands by while performing a reception scan of all channels that can potentially be used by the transmitter, receives the RF signal transmitted from the abovementioned transmitter, and thereby sets the reception channel to that channel and transmits a response signal to the transmitter on that channel. If the transmitter does not obtain a response signal from the receiver within a prescribed time period, it considers that communication with the receiver could not be established and therefore repeats the procedure once again from step S101 (step S105); however, if a response signal is received within the prescribed time period (step S106), then the transmitter considers that communication with the receiver has been established, stores the channel at that time as the working channel (step S107), and establishes RF communications with the receiver using that channel as the working channel that is in common with the receiver (step S108).

Nevertheless, the method discussed above, wherein RF communications is established with a communication counterpart via the multiscan method, requires a procedure that demands a response signal from the communication counterpart, and is therefore unpreferable because that procedure is complicated in an RF communications system that remotely controls a controlled apparatus, such as a home appliance, with a remote control transmitter.

In addition, in order to examine the electric field intensity of all channels in the available frequency band on the transmitter side and to receive an RF signal transmitted from the transmitter on the receiver side, both the transmitter and the receiver must perform a reception scan of all channels so as to detect the RF signal, and therefore it takes time to establish communication and the overall configuration of each apparatus becomes complicated.

Furthermore, with the RF communications system that remotely controls the controlled apparatus with the remote control transmitter, the controlled apparatus should receive the RF signal transmitted from the remote control transmitter, and therefore, despite the need to set the reception channel to a channel for which the electric field intensity is low at the location of the controlled apparatus, which is on the receiver side, the abovementioned conventional art sets the common working channel to a channel for which the electric field intensity is low in the vicinity of the transmitter, which makes communication prone to reception errors at the controlled apparatus. In particular, in contrast with the controlled apparatus, which is at a fixed position and is in a reception environment that does not change greatly, if the remote control transmitter approaches a source that generates strong electromagnetic waves, such as a microwave oven, then there are cases wherein the optimal channel for RF communications cannot be selected with the conventional method that searches for a channel with low electric field intensity at the location of the remote control transmitter.

In addition, because of the demand to reduce costs, conventional controlled apparatuses that operate by receiving infrared control signals often incorporate an IR communications system dedicated microcontroller that is equipped just with a pulse modulated signal input port, such as a PWM input port, that inputs a pulse modulated signal demodulated from the infrared control signal. However, in order to control a controlled apparatus that is equipped with such a microcontroller via an RF signal, it is not sufficient to just add an RF receiving circuit unit that has, for example, an antenna and a UART interface, but rather a large-scale modification that replaces everything, including the microcontroller, is required.

SUMMARY OF THE INVENTION

The present invention considers the problems of the conventional art, and it is an object of the present invention to provide an RF communications system wherein a controlled apparatus can easily receive an RF signal transmitted from a remote control transmitter on a channel that the controlled apparatus can receive—without obtaining a response signal from the controlled apparatus.

It is another object of the present invention to provide an RF communications system wherein a controlled apparatus receives an RF signal transmitted from a remote control transmitter on an optimal channel that has low electric field intensity—without complicating the configuration of the remote control transmitter or the controlled apparatus.

It is yet another object of the present invention to provide an RF communications system and an RF communications module that—with a simple modification that does not modify the microcontroller—is capable of making even a controlled apparatus that has an IR communications system dedicated microcontroller into a controlled apparatus that is controlled by the RF communications system.

To achieve the abovementioned objects, an RF communications system according to a first aspect of the invention comprises: a remote control transmitter that comprises a remote control side control unit that generates control data for controlling the operation of a controlled apparatus in accordance with an input operation and an RF transmitting circuit unit that generates RF packet data which contain the control data generated by the remote control side control unit and that transmits an RF signal that is modulated with the RF packet data via a transmitter antenna; and a controlled apparatus that comprises an RF receiving circuit unit that demodulates the RF packet data from the RF signal received by a receiving antenna and an apparatus side control unit that controls the operation of each unit based on control data that are contained in the modulated RF packet data; wherein the RF transmitting circuit unit divides a wireless frequency band, in which the RF transmitting circuit unit can transmit RF signals and the RF receiving circuit unit can receive RF signals, into a plurality of channels and transmits an RF signal on any one of the divided channels, and the RF receiving circuit unit stands by for the reception of the RF signal on a channel that is identical to the one on which the RF transmitting circuit unit transmitted the RF signal, and receives the RF signal transmitted by the RF transmitting circuit unit; wherein the RF transmitting circuit unit selects all or two or more channels of the channels divided from the wireless frequency band as transmission channels, and for each of the transmission channels, transmits an RF signal that is modulated to the frequency of that channel; and the RF receiving circuit unit monitors the electric field intensity of all transmission channels selected by the RF transmitting circuit unit and stands by for the reception of the RF signal on a channel that has a relatively low electric field intensity.

Because the RF transmitting circuit unit of the remote control transmitter transmits RF signals on all selected transmission channels of the plurality of channels that were divided up from the wireless frequency band, it transmits RF signals on at least a channel on which the RF receiving circuit unit is standing by for reception. The channel on which the RF receiving circuit unit stands by to receive an RF signal is the channel of all of the transmission channels that were selected by the transmitting circuit unit that has a relatively low electric field intensity, and therefore the RF receiving circuit unit can reliably receive the RF signal transmitted by the transmitting circuit unit in a satisfactory communication environment.

The establishment of RF communications between the remote control transmitter and the controlled apparatus is verified by the fact that the controlled apparatus operates based on the control data.

Because the control data is transmitted via the RF signal in a short time period, even if the RF signal is transmitted on all of the selected transmission channels, it is possible to transmit the control data in a time period that is shorter than that needed to transmit the identical amount of data via an infrared control signal, and therefore the control of the controlled apparatus is never delayed.

An RF communications system according to a second aspect of the invention has a RF receiving circuit unit of the controlled apparatus that includes: a pulse signal modulation unit that outputs a pulse modulated signal which is modulated with the control data of the RF packet data to the apparatus side control unit, which demodulates the control data from the pulse modulated signal; and a format storage unit that associates a pulse modulated signal format with which each apparatus side control unit of a plurality of controlled apparatuses can demodulate from the pulse modulated signal with an output code therefor, and stores the output codes and pulse modulated signal formats. The RF transmitting circuit unit of the remote control transmitter includes the output code that specifies the pulse modulated signal format with which the apparatus side control unit of the controlled apparatus that is remotely controlled via an RF signal is capable of demodulation in the RF packet data together with the control data; and the RF receiving circuit unit of the controlled apparatus reads out the pulse modulated signal format associated with the output code contained in the RF packet data from the format storage unit and outputs a pulse modulated signal, which is pulse modulated with control data in accordance with the pulse modulated signal format that was read out, to the apparatus side control unit.

The RF transmitting control circuit unit of the remote control transmitter transmits the control data and the output code to the controlled apparatus via an RF signal by including the output code in the RF packet data. The RF transmitting control circuit unit of the controlled apparatus reads out the pulse modulated signal format associated with the output code contained in the RF packet data from the format storage unit, and the pulse signal modulation unit outputs a pulse modulated signal that is pulse modulated with the control data in accordance with the pulse modulated signal format that was read out to the apparatus side control unit. Because the pulse modulated signal, which is in a demodulatable pulse modulated signal format, is input to the apparatus side control unit, the control data are demodulated from the pulse modulated signal.

An RF communications system according to the present invention preferably operates on a wireless frequency band of 2,400-2,483.5 MHz. The 2,400-2,483.5 MHz frequency band is a high frequency band. Because the natural world does not generate noise of a prescribed electric field intensity over the entire band, the RF receiving circuit unit can stand by for the reception of an RF signal on any transmission channel that has a low electric field intensity.

In addition, because this frequency band is used in, for example, the channels of BLUETOOTH® wireless local area networks (LANs) and channels stipulated by the IEEE® 802.15.4 standard, there is a possibility that artificial noise will be generated; however, it will similarly not be generated over the entire band, and it is therefore possible to stand by for the reception of an RF signal on any transmission channel that is not superimposed with artificial noise.

An RF communications system according to the present invention also preferably outputs an RF signal that is a modulated signal that has been directly spread spectrum modulated with RF packet data to a frequency band of a transmission channel. Even if noise of a prescribed electric field intensity is generated in the frequency band of a transmission channel, it is spread when the RF packet data are demodulated from the RF signal, which makes it possible to demodulate such reliably.

According to principles of the invention, RF communications is established between a remote control transmitter and a controlled apparatus on a channel that has a low electric field intensity without performing a reception scan on a plurality of channels only at the controlled apparatus, which makes it possible to simplify the configuration of the remote control transmitter and to reduce its size and weight.

In addition, because the operator of the remote control transmitter can verify that the RF signal has been received by the controlled apparatus by the fact that the controlled apparatus is operating based on the control data, it is possible to know that RF communications has been established without receiving a response signal from the controlled apparatus.

Further, because the controlled apparatus searches for a channel with a low electric field intensity and then stands by for reception on that channel, the remote control transmitter can reliably receive the RF signal even if it approaches a noise source.

According to another aspect of the present invention, even if an apparatus side control unit that demodulates control data is an IR communications system dedicated type, it is possible to remotely control the controlled apparatus via an RF signal without greatly modifying the structure of the controlled apparatus. In addition, it is possible to reliably control the controlled apparatus remotely, even if an obstacle is present between the remote control transmitter and the controlled apparatus, or if the remote control transmitter is oriented away from the controlled apparatus.

According to another aspect of the invention, even if noise is generated, whether due to the natural world or an artificial cause, that noise is not generated over the entire 2,400-2,483.5 MHz frequency band, and it is therefore possible to reliably receive an RF signal on some transmission channel. In addition, because there are numerous short range wireless communications apparatuses that use, for example, Bluetooth wireless LAN channels and the IEEE 802.15.4 standard channels as the communication band, communications circuit devices and communications modules for this frequency band can be inexpensively obtained, and it is therefore possible to inexpensively manufacture the RF transmitting circuit unit and the RF receiving circuit unit using these devices or modules.

According to another aspect of the invention, even if high frequency noise is generated on the transmission channel on which a unit is standing by for the reception of a signal, demodulation errors tend not to occur, which makes it possible to reliably control the controlled apparatus remotely.

In addition, all of the channels divided from the available frequency band may be used as transmission channels; furthermore, an arbitrary channel that is spaced apart from the center frequency may be used as the transmission channel. In addition, regardless of the frequency bands of the transmission channels, the transmission order of RF signals is arbitrary, e.g., the transmission of RF signals on channels 15, 20, and 25 that are hardly used in comparison by other RF communications systems may be given priority over other channels.

In addition, the format storage unit 15 and the pulse signal modulation unit 16 may each comprise a storage device, a circuit device, and the like that are separate from the control MPU 8; furthermore, the pulse signal format stored in the format storage unit 15 may be a signal format of another modulation method such as that of a PPM modulated signal.

Furthermore, the pairing channel used in the pairing mode was explained using an example wherein the pairing channel is set to a prescribed specified channel in advance; however, the pairing channel on the remote control transmitter 3 side may be set to a channel that has a low electric field intensity, and the RF communications module on the controlled apparatus 4 side may perform a reception scan on all channels in the available frequency band and receive an RF signal that indicates pairing start.

In addition to each of the above-described embodiments of the present invention, it is intended that the scope of the present invention include all foreseeable equivalents to each and every element of the above-described embodiments.

BRIEF DESCRIPTION OF THE DRAWINGS

The invention will become more readily apparent from the Detailed Description of the Invention, which proceeds with reference to the drawings, in which.

Figure 1:
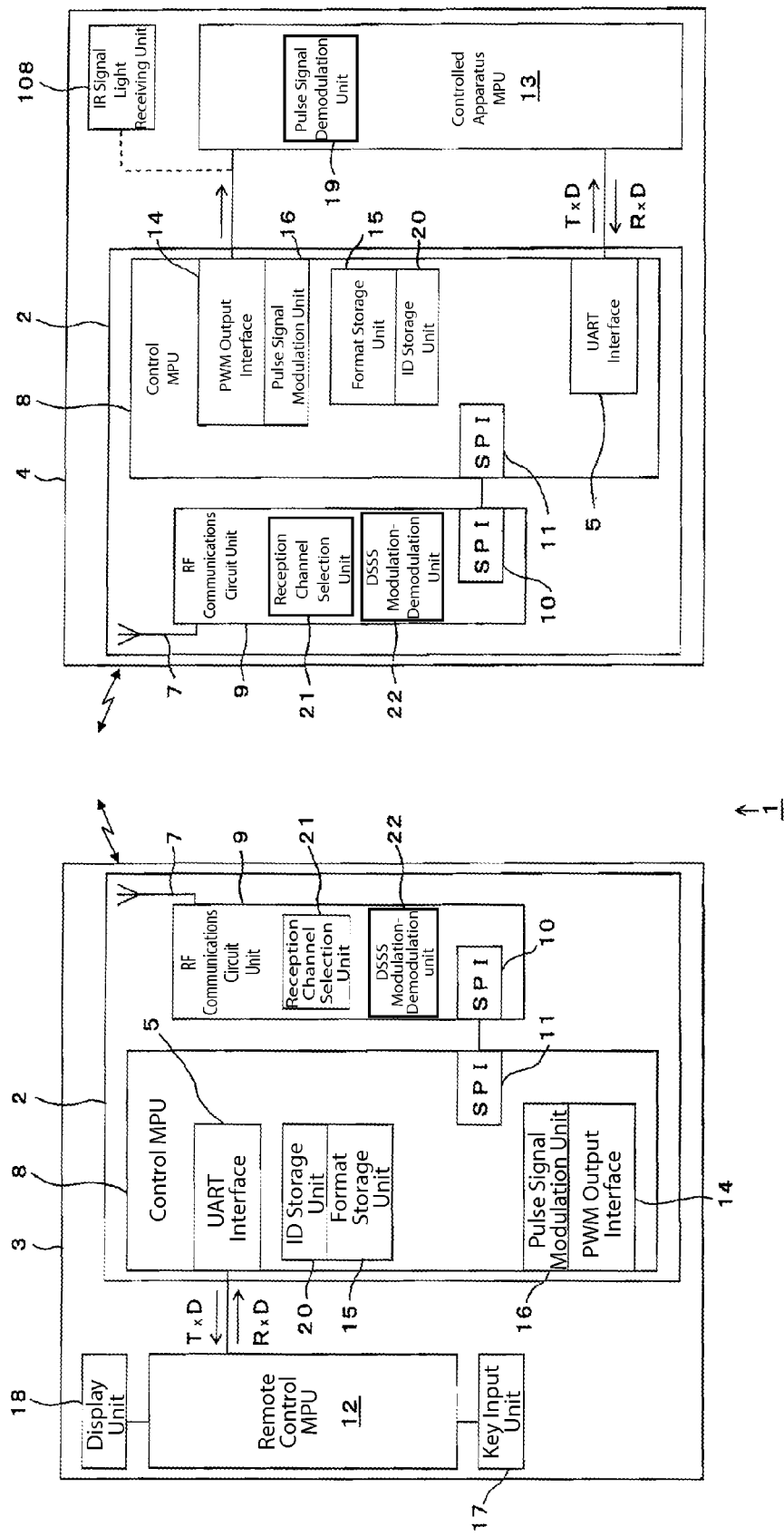
FIG. 1 is a block diagram that shows the configuration of a RF communications system 1 according to an embodiment of the present invention.

In the figures, elements that are repeatedly illustrated are consistently identified by a single reference manual.

DETAILED DESCRIPTION OF THE INVENTION

The following table provides a key to the reference numerals and elements depicted in the drawings.

Figures 2, 3:
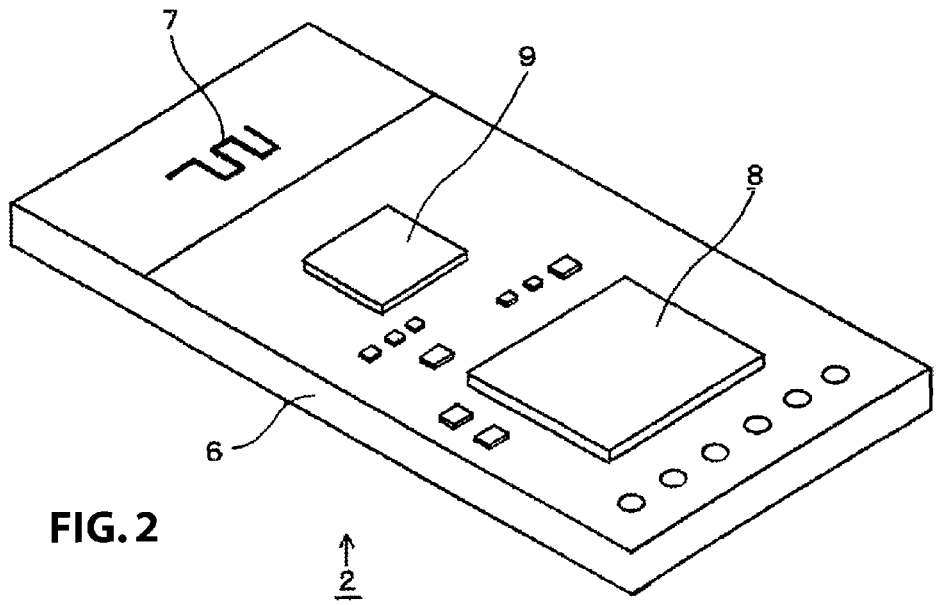
FIG. 2 is an oblique view of an RF communications module 2 according to the embodiment of FIG. 1.
FIG. 3 is an explanatory diagram that shows the format of UART data that are input and output via the UART interface 5 of FIG. 1.

1 RF communications system
2 RF communications module (RF transmitting circuit unit, RF receiving circuit unit)
3 Remote control transmitter
4 Controlled apparatus 7 Printed antenna (transmitter antenna, receiving antenna)
12 Remote control MPU (remote control side control unit)
13 Controlled apparatus MPU (apparatus side control unit)
15 Format storage unit
16 Pulse signal modulation unit
19 Pulse signal demodulation unit The following description is directed to an RF communications system 1 in accordance with principles of the present invention, referencing FIG. 1 through FIG. 8. FIG. 1 is a block diagram that shows an RF communications system 1 that comprises a remote control transmitter 3, which is on the RF signal transmitting side, and a controlled apparatus 4, which is on the RF signal receiving side. In the present embodiment, the remote control transmitter 3 and the controlled apparatus 4 each comprise an RF communications module 2 of the same configuration as shown in FIG. 2. The RF communications modules 2 correspond to the RF transmitting circuit unit that constitutes the remote control transmitter 3 and the RF receiving circuit unit that constitutes the controlled apparatus 4 of the present invention, and therefore the remote control transmitter 3 and the controlled apparatus 4 herein each preferably have a RF communications module 2 of identical configuration and consequently are equipped with bidirectional RF communications functions.

Each RF communications module 2 comprises a printed wiring board 6; in addition, on one surface of the printed wiring board 6, each RF communications module 2 further comprise a printed antenna 7 that is formed by printing and wiring a conductive pattern on a mounting surface of the RF communications module 2; a communications control unit 8 of a control MPU that is mounted on the remaining mounting surface and an RF communications circuit unit 9. A glass epoxy resin wiring board, which has excellent electrical and mechanical properties, is preferably used for each printed wiring board 6, and each printed antenna 7 is formed by printing and wiring it on the wiring board 6, which has a high dielectric constant, and therefore constant, satisfactory RF communications characteristics are obtained that are unaffected by, for example, manufacturing errors. Because each printed antenna 7 functions as an antenna that transmits and receives RF signals, a power supply unit at one end of each module 2 is connected to an RF input-output port (not shown) of the corresponding RF communications circuit unit 9.

Each RF communications circuit unit 9 as shown in FIG. 1 comprises a reception channel selection unit 21 and a direct sequence spread spectrum (DSSS) modulator-demodulator unit 22. The DSSS modulation-demodulation unit 22 outputs an RF signal, which is spread spectrum modulated with all RF packet data (discussed later) that are output by the corresponding communications control unit 8 to the corresponding printed antenna 7, demodulates all RF packet data from RF signals received by the printed antenna 7 in the frequency band of a reception channel (discussed later), and outputs the demodulated data to the communications control unit 8 to which it is connected via an SPI (serial peripheral interface) 10.

The RF communications circuit unit 9 can preferably transmit and receive RF signals in an available frequency band of 2,400-2,483.5 MHz; however, when the RF communications module 2 serves as the RF transmitting circuit unit and transmits an RF signal, the signal is sequentially spread spectrum modulated in the frequency band of each transmission channel of the transmission channels that were divided from the available frequency band.

Figure 5:
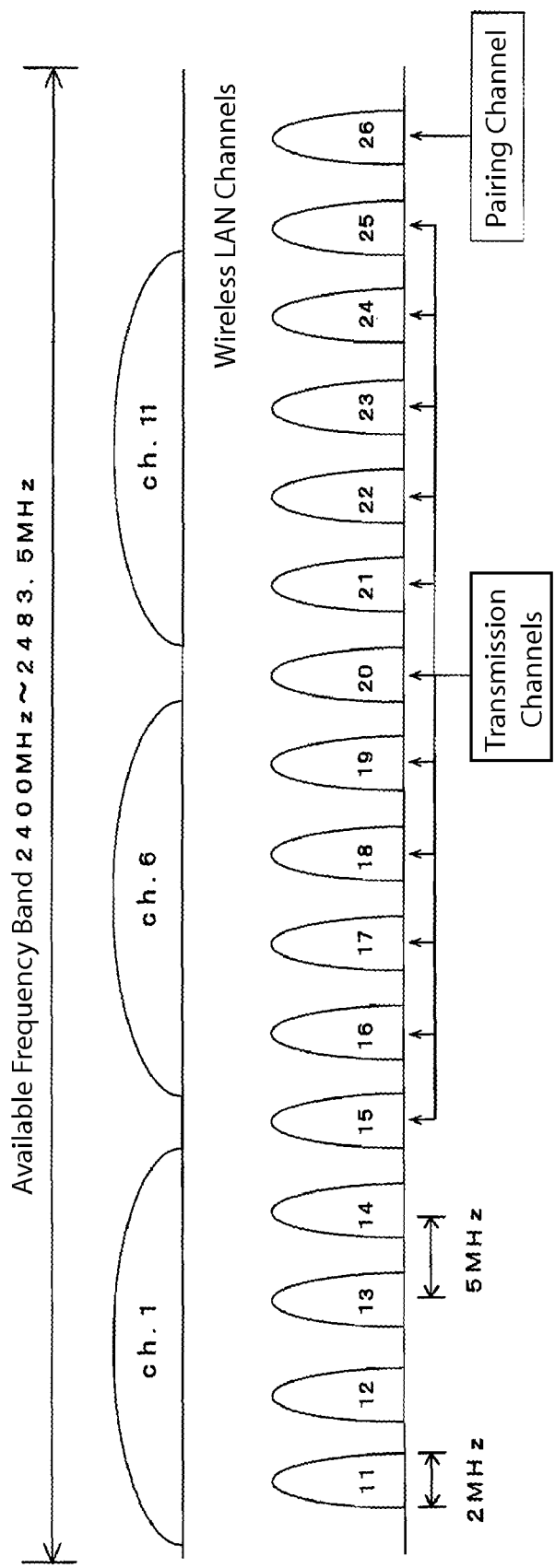
FIG. 5 is an explanatory diagram that shows the relationship between transmission channels and a 2.4 GHz available frequency band.

As shown for example in FIG. 5, the available frequency band is divided into 5 MHz intervals and used as channels, wherein each channel is allocated a bandwidth of 2 MHz as stipulated by the IEEE 802.15.4 standard; furthermore, channels 15-25 are used as the transmission channels that transmit control data. In other words, when control data is transmitted via an RF signal, the relevant DSSS modulation-demodulation unit 22 outputs the RF signal, which is spread spectrum modulated with RF packet data that contains the control data into the frequency bands from channel 15 to channel 25, to the corresponding printed antenna 7, and sequentially transmits the RF signal on channels 15 to 25.

Moreover, if the RF communications module 2 is the RF receiving circuit unit of the controlled apparatus 4 that receives the RF signal, then the reception channel selection unit 21 operates so as to perform a reception scan of the abovementioned transmission channels from channel 15 to channel 25 at prescribed intervals, monitors the electric field intensity (reception energy) of each channel, sets the channel among all of the transmission channels that has the lowest electric field intensity as the reception channel, and stands by for the reception of an RF signal on that reception channel.

Each control microprocessor unit (MPU) 8 is connected to the corresponding RF communications circuit unit 9 via a serial peripheral interface (SPI) 11 and comprises: a UART interface 5 that can connect to a remote control MPU 12 or a controlled apparatus MPU 13 that input and output serial transmit data (TxD) and receive data (RxD), respectively; and a pulse signal interface 14 in the control MPU 8 of the controlled apparatus 4 that can connect to the controlled apparatus MPU 13, which has a pulse modulated signal input port. Namely, as shown in FIG. 1, if either the MPU 12 or the MPU 13 has a built-in UART (universal asynchronous receiver transmitter), which converts serial bit stream data into parallel byte data that are handled by the relevant MPU, and also has an input-output port that inputs and outputs serial transmit data (TxD) and receive data (RxD), then it is connected to the corresponding UART interface 5; in addition, if the controlled apparatus MPU 13 has the pulse modulated signal input port (herein, a PWM input port) that inputs a pulse modulated signal, then, instead of or along with being connected to the UART interface 5, it is connected to the pulse signal interface (PWM output interface) 14.

In addition, an ID storage unit 20 is built into each communications control unit 8 and stores an assigned unique ID and a communication counterpart ID specified by a pairing process. The unique ID may be assigned, based on, for example, the manufacturing date and the product number of the RF communications module 2 that comprises that ID storage unit 20. A master ID is stored as an assigned unique ID in the ID storage unit 20 of the RF communications module 2 that is attached to the remote control transmitter 3, and a slave ID is stored as an assigned unique ID in the ID storage unit 20 of the RF communications module 2 that is attached to the controlled apparatus 4.

When either communications control unit 8 inputs UART data, which is discussed later, from its respective MPU 12 or 13 via the corresponding UART interface 5, RF packet data that are to be transmitted via an RF signal are generated and output to the corresponding RF communications circuit unit 9. The following description explains the format of this RF packet data, with reference to FIG. 4. A preamble is followed by a 1 byte frame start signal that indicates the head of a communication frame, which is followed by a 1 byte "frame length" field that indicates the length of the entire frame. The "status code" field that follows the "frame length" field reports with one byte of data the purpose of the communication to the communication counterpart of the RF signal, and is assigned "70h" if control data is transported. An "ID code" field indicates a unique ID that is assigned to the communications source that transmits the RF packet data, and is read out from the relevant ID storage unit 20 when the RF packet data are generated. The receiving side, which receives the RF signal, compares the unique ID indicated in the "ID code" of the demodulated RF packet data with the unique ID of the communication counterpart that is stored in the ID storage unit 20, and rejects the reception of the RF signal if it does not match the unique ID of the communication counterpart. Accordingly, other controlled apparatuses that similarly comprise RF signal reception and demodulation functions are not mistakenly operated—even if they are disposed within the RF communications area. The UART data that contain control data (discussed later) input from the MPU 12 or the MPU 13 are included in the "transport data" as is. After the "transport data," a "CRC" (cyclic redundancy check) code, which is generated based on the data of the entire RF packet, is appended.

With the aim of using an IR signal to transmit control data with optimum communication quality in a conventional IR communications system that performs remote control by transmitting an IR signal that is modulated with control data to a controlled apparatus, the pulse width modulation (PWM) method or the pulse position modulation (PPM) method is used as the primary method of modulating the control data, and a secondary modulated signal, for which a 38 KHz burst wave is secondarily modulated with the primary modulated pulse modulated signal, is transmitted as the IR signal. The controlled apparatus MPU 13 of the controlled apparatus 4, which is on the receiving side of the IR signal, has a pulse modulated signal input port in order to input the pulse modulated signal, which was demodulated from the IR signal, and to demodulate the control data. To further reduce manufacturing costs, the controlled apparatus MPU 13 of an IR communications system dedicated controlled apparatus 4A (refer to FIG. 7) may only have the pulse modulated signal input port and a pulse signal demodulation unit 19, and not have a serial data input-output port. Furthermore, the RF communications module 2 may be connected to a controlled apparatus MPU 13 of this type.

The format of the pulse modulated signal used by the IR communications system can be varied according to the pulse modulation method, the manufacturer of the controlled apparatus, and the category of the controlled apparatus so that other unintended apparatuses are not mistakenly operated as a result of the transmission of an IR signal. Accordingly, although the pulse signal demodulation unit 19 of the controlled apparatus MPU 13 that has the pulse modulated signal input port is configured so that it decodes only pulse modulated signals that have a specified pulse modulated signal format, the communications control unit 8, in order to enable the pulse signal interface 14 to output a pulse modulated signal that can be demodulated by that controlled apparatus MPU 13, may further include: a format storage unit 15 that stores other types of pulse modulated signal formats that differ by pulse modulation method, the manufacturer of the controlled apparatus, and the category of the controlled apparatus; and a pulse signal modulation unit 16 for generating the pulse modulated signal. The other types of pulse modulated signal formats are each associated with an output code, which is discussed later, and stored in the format storage unit 15, and the pulse signal modulation unit 16 generates the pulse modulated signal in the pulse modulated signal format that is associated with a particular output code.

In the remote control transmitter 3, an input port that inputs the transmit data (TxD) and an output port that outputs the receive data (RxD) of the remote control MPU 12 are each connected to the UART interface 5 of the communications control unit 8, which is attached to the RF communications module 2 as depicted in FIG. 1. A key input unit 17, which comprises multiple keys that are capable of an input operation such as a pressing operation, and a display unit 18, which displays, for example, guidance on the input operation for each key and the result of the key input operation, may preferably be connected to the remote control MPU 12 of the remote control transmitter 3.

In order for an operator to understand the correspondence between the input operation of each key of the key input unit 17 and the operation of the controlled apparatus 4 that is controlled thereby, guidance is provided on the input operation method for each key by, for example, an indication on that key or a display on the display unit 18; furthermore, the remote control MPU 12 generates control data that correspond to the key on which the input operation was performed.

The control data generated by the remote control MPU 12 contain UART data in the UART data format shown in FIG. 3, and are output from the UART interface 5 to the communications control unit 8. As shown in FIG. 3, the UART data may be input and output as bit stream data, and therefore a start text field and an end text field are appended before and after the data in order to indicate the data frame that is to be input or output.

After the start bit, a 1 byte "output code" is determined based on the type of the controlled apparatus MPU 13 of the controlled apparatus 4; therefore, if serial UART data are output from the UART interface 5 of the RF communications module 2 on the apparatus side to the controlled apparatus MPU 13, then the "output code" is set to "40h." In addition, if a PWM modulated signal is output from the PWM output interface 14 of the RF communications module 2 on the apparatus side to the PWM input port of the controlled apparatus MPU 13, then the "output code" is set to any code, e.g., "51h" through "53h" or the like, that specifies a pulse modulated signal format that can be demodulated by that controlled apparatus MPU 13. Furthermore, because an "output code" of "A0h" or below is used when controlling the controlled apparatus in special circumstances such as when performing shipping inspection, reporting that these "output codes" are for specialized control to the controlled apparatus 4 for which a communication counterpart has not been specified by the pairing process makes it possible, for example, to perform remote control with control data. The control data are indicated by "transmit data," for which a maximum of 119 bytes are allocated, and the 1 byte "data length" field indicates the byte count of the data in the "transmit data."

In the controlled apparatus 4, the serial input-output port of the controlled apparatus MPU 13 is connected to the UART interface 5 of the communications control unit 8, the PWM input port is connected to the PWM output interface 14, and both the UART interface 5 and the PWM output interface 14 are attached to the RF communications module 2 on the apparatus side. If we assume that the controlled apparatus 4 is one that is controlled by the reception of an IR signal that is modulated by a PWM modulated signal in format #2 of company "A," then the controlled apparatus 4 comprises an IR signal light receiving unit 108 that receives the light of the IR signal and demodulates the PWM modulated signal from the envelope of the received signal waveform that was photoelectrically converted, and the pulse signal demodulation unit 19 of the controlled apparatus MPU 13 inputs that PWM modulated signal via the PWM input port and demodulates the control data contained in the UART data. However, the PWM input port connection, which to the IR signal light receiving unit 108 at this point in time, may also be switched to the PWM output interface 14 of the apparatus side RF communications module 2.

In addition, by connecting the input port, which inputs the transmit data (TxD), to the UART interface 5 of the communications control unit 8, the controlled apparatus MPU 13 can input bit stream UART data from the RF communications module 2, and can therefore obtain control data from either the PWM input port or the input port that inputs serial data. Moreover, the output port that outputs the receive data (RxD) is connected to the RF communications module 2, and therefore it is possible to output UART data in the UART data format shown in FIG. 3; for example, operation information (room temperature and the like) of the controlled apparatus 4, which is an air conditioner, can be included in the "transmit data" of the UART data transmitted to the remote control transmitter 3 and then displayed on the display unit 18 thereof.

Figure 6:
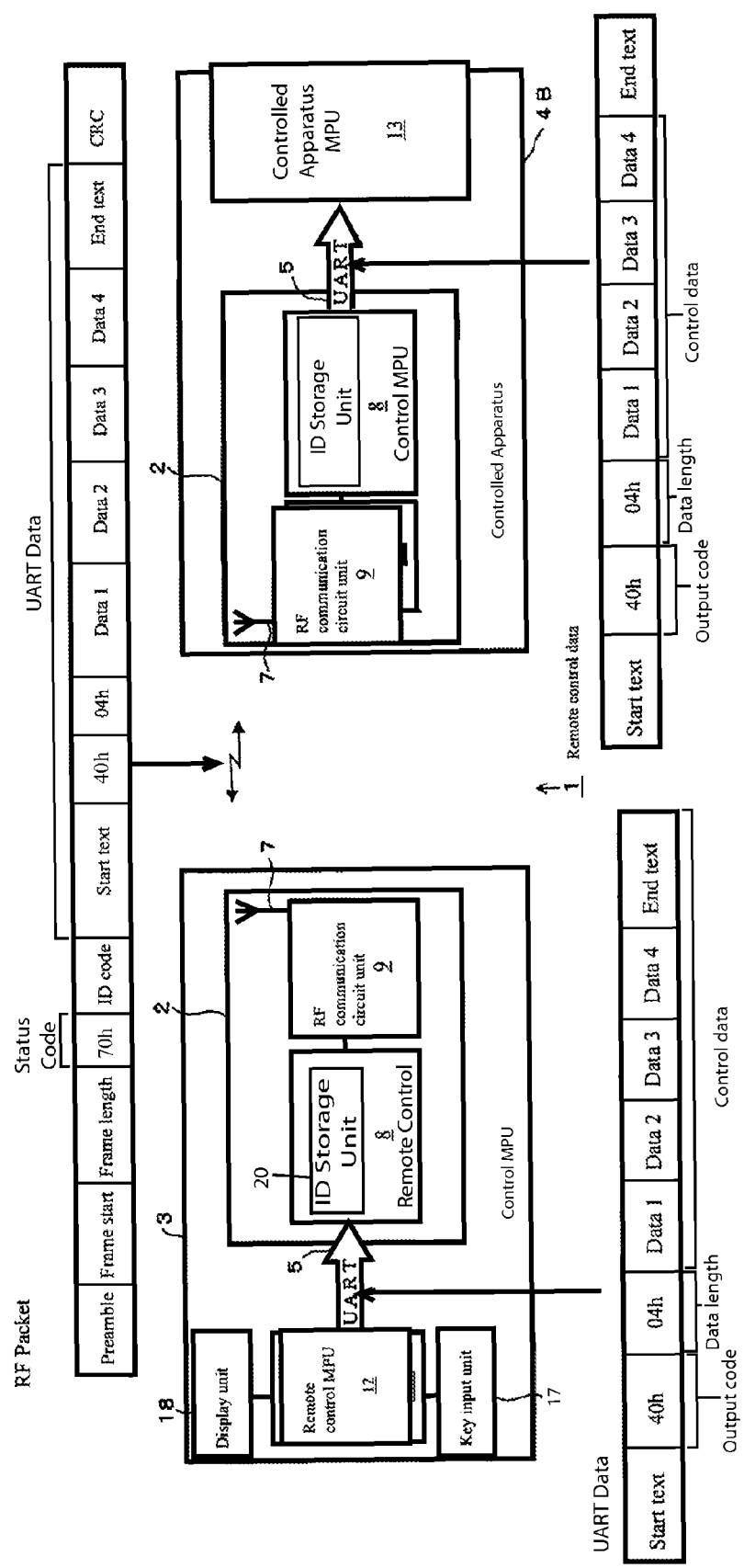
FIG. 6 is a block diagram that illustrates operation of a RF communications system dedicated controlled apparatus 4B that is remotely controlled via an RF signal transmitted from a remote control transmitter 3.

The following explains a case wherein the controlled apparatus 4 is a controlled apparatus 4B, as shown in FIG. 6 that is configured so that operations, such as the transmission of an RF signal by the remote control transmitter 3 and the reception of that RF signal by the controlled apparatus 4, are controlled via RF signals. In the present embodiment, through the pairing process (discussed later), the ID storage unit 20 of the remote control transmitter 3 stores the master ID, which is a unique ID assigned to itself, and the slave ID that is assigned to the specified communication counterpart, and the ID storage unit 20 of the controlled apparatus 4 stores the slave ID, which is a unique ID assigned to itself, and the master ID that is assigned to the specified communication counterpart, and thereby the communication counterparts are mutually specified.

Assuming that the operator is trying to raise the volume of a television, which is the controlled apparatus 4, if an input operation is performed on the key input unit 17 of the remote control transmitter 3, then the remote control MPU 12 generates, for example, 4 bytes of control data "data 1 through data 4," which contain an instruction to raise the volume, based on the key data of the key on which the input operation was performed. As shown in FIG. 6, if we assume that the controlled apparatus 4 is the controlled apparatus 4B of an RF communications system that is configured so that it is controlled by RF signals, then UART data, wherein the "output code" is set to "40h," "data 1 through data 4" are generated from the "transmit data," and the "data length" is set to "04h" that indicates the 4 bytes of "data 1 through data 4," are output from the output port to the communications control unit 8 of the remote control side RF communications module 2 via the corresponding UART interface 5.

If UART data are input from the UART interface 5, then the communications control unit 8 generates RF packet data that are transmitted via an RF signal. As shown in FIG. 6, the "status code" of this RF packet is assigned "70h" because UART data that contain control data are being transported, and the UART data (discussed above) that were input from the UART interface 5 are included in the "transport data," which follow the "ID code," as is; thereby, the control data (data 1 through data 4) are included in the RF packet data along with the output code of "40h."

Figure 4:
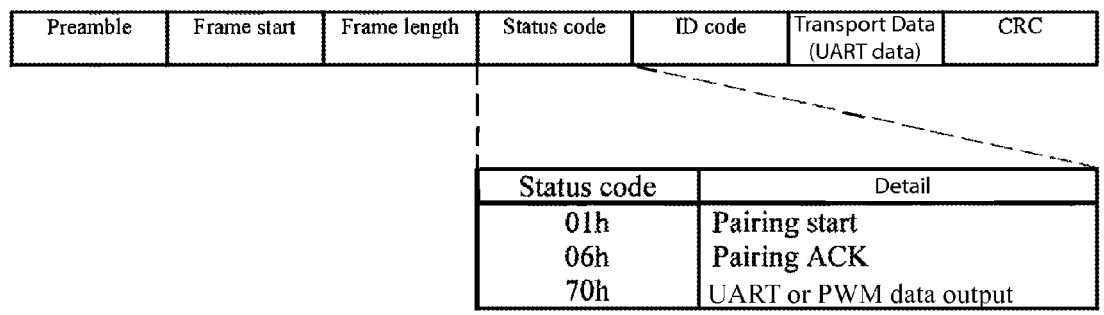
FIG. 4 is an explanatory diagram that shows the format of an RF packet that is transmitted and received via an RF signal.

The RF packet data generated by the communications control unit 8 are output to the RF communications circuit unit 9 via the SPIs 11, 10, and the DSSS modulation-demodulation unit 22 of the RF communications circuit unit 9 DSSS spread spectrum modulates all data of this RF packet into the frequency band of each transmission channel from channel 15 to 25, as shown in FIG. 4, and the modulated RF signal is sequentially transmitted from the printed antenna 7. In this manner, despite the presence of, for example, high frequency noise and other RF signals that are superimposed in the frequency band of the channel on which transmission is being attempted, the RF signal is transmitted on all transmission channels prescribed by the RF transmitting circuit unit 2 in advance. The transmission time needed to transmit 125 bytes of RF packet data in the 2.4 GHz band is approximately 0.4 ms per channel; furthermore, even if the RF signal is transmitted repeatedly on the transmission channel of channel 16, the transmission time is for example 6.4 ms. In addition, even if the processing times of the two RF transmitting circuit units 2 are added to the transmission time, the total time is still far shorter than that of an IR communications system with a transmission time of 50-100 ms.

At the RF communications module (RF receiving circuit unit) 2 on the controlled apparatus 4 side, the reception channel selection unit 21 sets the channel of the transmission channels 15-25 that has the lowest electric field intensity as the reception channel and stands by for the reception of an RF signal on that reception channel, as discussed above. Because the reception channel selection unit 21 of FIG. 1 on the controlled apparatus 4 side detects the intensity of the electric field in the vicinity of the controlled apparatus 4, even if there is a noise generating source in the vicinity of the remote control transmitter 3, it is often the case that the electric field intensity of that noise on the reception channel at the controlled apparatus 4 side is below a threshold value at which RF packet data can be demodulated, and therefore demodulation errors occur infrequently. In addition, transmission channels 15, 20, and 25 are in frequency bands that are between channels that are used by wireless LAN channels, as shown in FIG. 5, and therefore hardly superimpose the RF signals of wireless LANs.

When the RF signal on the reception channel is received from the printed antenna 7 on the controlled apparatus 4 side via the RF communications module 21, the RF packet data shown in FIG. 6 are DSSS demodulated by the DSSS modulation-demodulation unit 22, and then output to the communications control unit (control MPU) 8 via the SPIs 10, 11. If the "status code" of the RF packet data is "70h," then the communications control unit 8 assumes that control data are being transported, reads the master ID of the communication counterpart stored in the ID storage unit 20, and compares such with the master ID contained in the "ID code" of the RF packet data; if there is not a match, then the received RF signal is ignored; in addition, if there is a match, then it is determined that the RF signal has been transmitted from the specified communication counterpart. Because the "output code" of the RF packet data is "40h," the communications control unit 8 outputs the UART data portion of the RF packet data, as is, from the UART interface 5 to the input port of the controlled apparatus MPU 13 as bit stream transmit data (TxD), as shown in FIG. 6. The controlled apparatus MPU 13 performs control so as to raise the volume of the television, which is the controlled apparatus 4, in accordance with the control data (data 1 to data 4) contained in the UART data.

In this RF signal transmission process, the RF communications module (RF receiving circuit unit) 2 of the controlled apparatus 4 ignores the received RF signal in certain cases, such as when the RF packet data cannot be demodulated or when the master ID that is read out from the ID storage unit 20 does not match the "ID code" of the RF packet data, and does not transmit an ACK signal back to the remote control transmitter 3 side even if the RF signal is received normally. Whether the RF signal that contains control data is received normally by the controlled apparatus 4 can be determined by whether the controlled apparatus 4 responds based on that control data, and therefore there is no need to transmit an ACK signal back; thereby, it is possible to transmit control data with a simple communication process even with an RF communications system.

Figure 7:
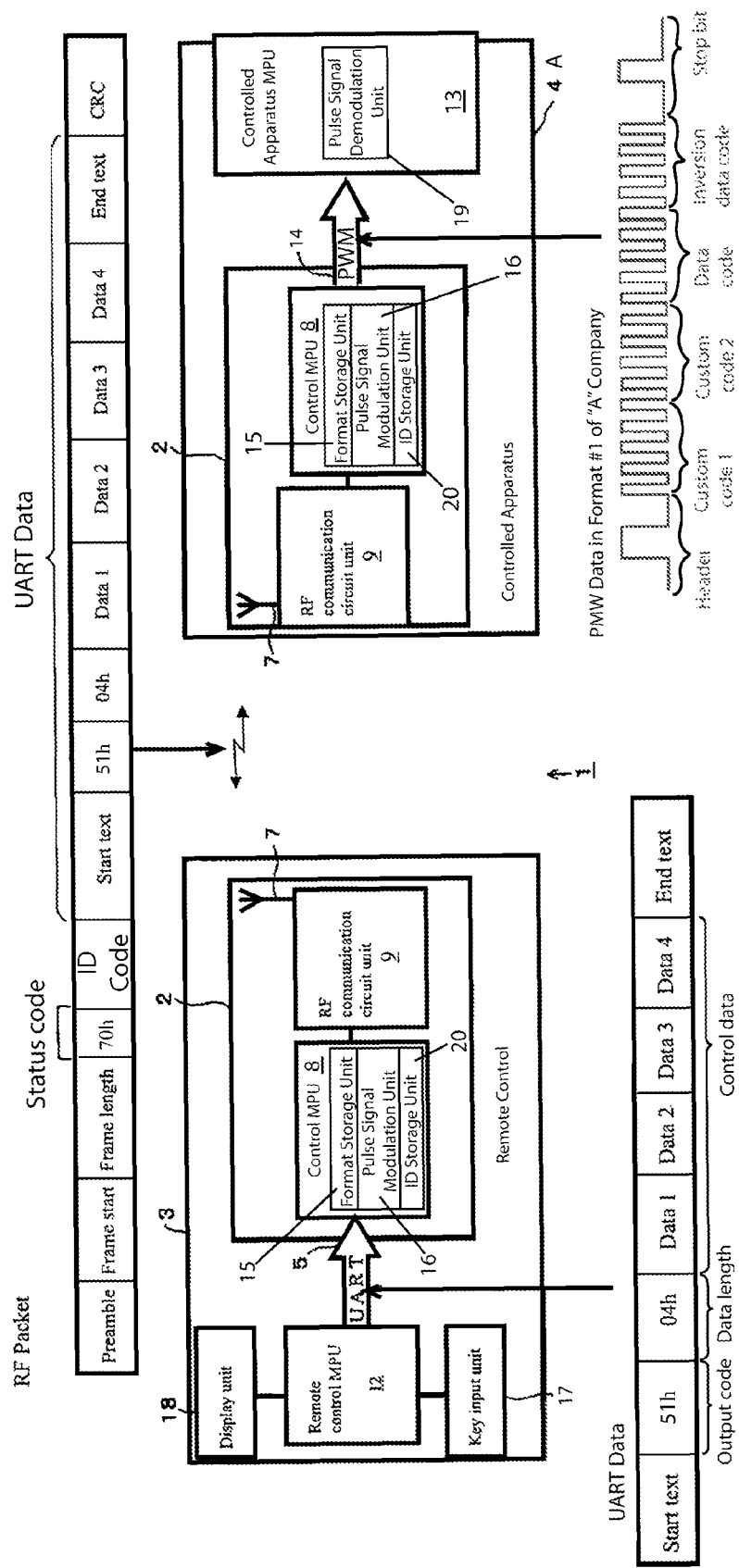
FIG. 7 is a block diagram that illustrates operation of an IR communications system dedicated controlled apparatus 4A that is remotely controlled via an RF signal transmitted from the remote control transmitter 3.

The following explains the operation for a case wherein the controlled apparatus 4 is the IR communications system dedicated controlled apparatus 4A shown in FIG. 7 that has a controlled apparatus MPU 13 that inputs a pulse modulated signal, which is demodulated from an IR signal, from the pulse modulated signal input port. If the controlled apparatus is the IR communications system dedicated controlled apparatus 4A, then the output code of the UART data generated by the remote control MPU 12 of the remote control transmitter 3 is set to an output code that specifies a pulse signal format that can be demodulated by that controlled apparatus MPU 13. If the controlled apparatus 4 is the controlled apparatus 4A, which receives PWM modulated signals in format #1 of company "A," then the "output code" of the UART data generated by the remote control MPU 12 is set to "51h," as shown in FIG. 3.

The operation up to the point at which the RF communications module (RF receiving circuit unit) 2 of the controlled apparatus 4A demodulates the RF packet data is similar to that discussed above and is therefore omitted; thereupon, RF packet data for which the output code has changed from "40h" (FIG. 6) to "51h" (FIG. 7) are input to the communications control unit 8 of the controlled apparatus 4A.

On the condition that the "status code" of the RF packet data is "70h," which indicates that the RF packet data contains control data, and the master ID contained in the "ID code" matches the master ID of the communication counterpart stored in the ID storage unit 20, the output code is "51h" and therefore the communications control unit 8 reads out format #1 of company "A" from the format storage unit 15, uses the pulse signal modulation unit 16 to perform PWM modulation on the input UART data in accordance with format #1 of company "A," and outputs the PWM modulated signal from the PWM output interface 14 to the PWM input port, which is a pulse modulated signal input port, of the controlled apparatus MPU 13.

As shown in FIG. 7, the PWM modulated signal that is output to the controlled apparatus MPU 13 comprises pulse signals, which are of two pulse widths in accordance with binary data, that are generated based on PWM data that comprise the sequence of: a custom code 1 that indicates, for example, that the product is intended for company "A"; a custom code 2 that indicates that the product category is air conditioner; a data code that indicates that control data (data 1 through data 4) are contained in the UART data; and an inverse data code, which is the inverse of all of the data of that data code; furthermore, pulse signals that indicate a header and a stop bit are placed before and after the above pulse signals.

The controlled apparatus MPU 13 demodulates the control data from the PWM modulated signal that was input via the PWM input port, and performs controls so as to raise the volume of a television, which is the controlled apparatus 4A, in accordance with the control data, which contain an instruction to "raise the volume." Accordingly, even if the controlled apparatus MPU 13 is one that inputs and demodulates only PWM modulated signals in format #1 of company "A" via the PWM input port, it is possible to use an RF signal to remotely control the controlled apparatus 4A without significantly modifying its structure.

According to the present embodiment, even if the controlled apparatus MPU 13 inputs and demodulates a pulse modulated signal in a different format, it is possible to output a pulse modulated signal that can be demodulated by the controlled apparatus MPU 13 merely by associating that format with the output code and storing such in the format storage unit 15.

In addition, because the pulse modulated signal or a modulated signal thereof is generated by the communications control unit 8 on the controlled apparatus 4A side without actually transmitting such as an IR signal, the controlled apparatus MPU 13 can accurately demodulate the control data without generating pulse distortion in the pulse modulated signal that is caused by, for example, the communication environment or the transceiver device.

Figure 8:
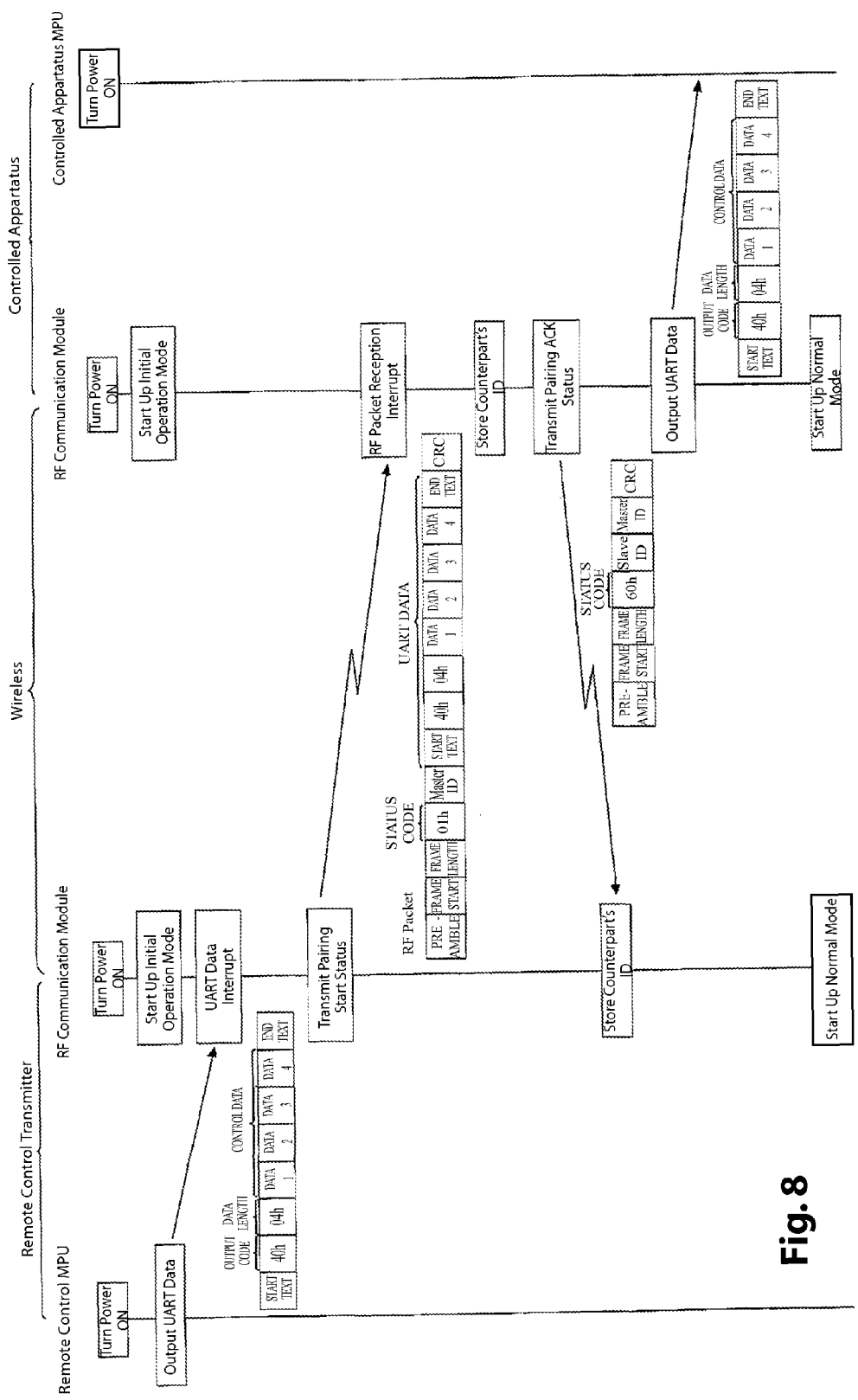
FIG. 8 is a flow chart that shows a pairing process between the remote control transmitter 3 and a controlled apparatus 4 of FIG. 1.
Figure 9:
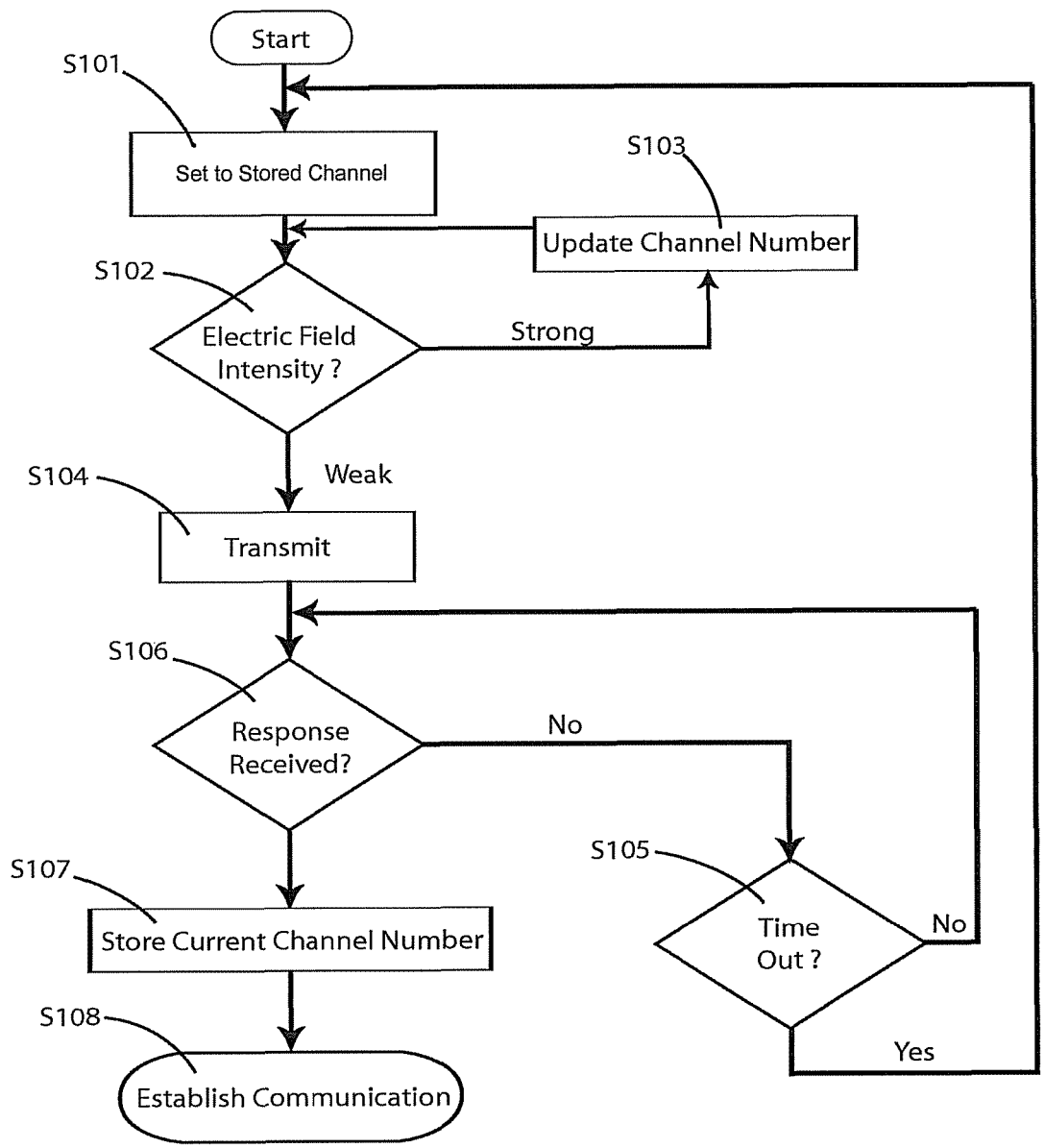
FIG. 9 is a flow chart that shows the operation of a conventional RF communications system that uses a multiscan access method.

In the embodiment discussed above, the pairing process that stores, in the ID storage unit 20 of the remote control transmitter 3, the master ID that is a unique ID assigned to itself and a slave ID that is assigned to the specified communication counterpart, and that stores, in the ID storage unit 20 of the controlled apparatus 4, the slave ID that is the unique ID assigned to itself and the master ID that is assigned to the specified communication counterpart, may store such in advance for example in Read-Only Memory (ROM) devices, which may constitute the ID storage units 20, in the process of manufacturing the RF communications module (RF transmitting circuit unit, RF receiving circuit unit) 2; alternatively, because the RF communications modules 2 have bidirectional RF communications functions, such may be stored through the pairing process that is explained in FIG. 8.

The pairing process will now be explained. The pairing process is executed along with a process wherein the operator who purchased the controlled apparatus 4 initially performs an input operation on a key of the remote control transmitter 3 in order to remotely control the controlled apparatus 4.

As shown in FIG. 8, when the power to the remote control transmitter 3 and the controlled apparatus 4 is turned on, the boot programs of the remote control MPU 12 and the controlled apparatus MPU 13 are started up and initialized, and it is then determined whether the pairing process is complete. Whether or not the pairing process is complete is determined by whether the unique ID of the communication counterpart, which indicates a specified communication counterpart, is stored in the relevant ID storage unit 20; immediately after the controlled apparatus 4 is purchased, neither the ID storage unit 20 of the remote control transmitter 3 nor the ID storage unit 20 of the controlled apparatus 4 (the remote control transmitter 3 and the controlled apparatus 4 are sold as a pair) stores the unique ID of the communication counterpart, which indicates the specified communication counterpart, and therefore the RF communications module 2 of the remote control transmitter 3 and the RF communications module 2 of the controlled apparatus 4 transition to an initial operation mode and stand by for the input of UART data or RF packet data that are demodulated from an RF signal.

Assuming that the operator is the one who initially remotely controls the controlled apparatus 4 after the purchase is made, if he or she performs an input operation on the key input unit 17 of the remote control transmitter 3, then the remote control MPU 12, assuming that the controlled apparatus MPU 13 of the controlled apparatus 4 specified as the communication counterpart is a microcontroller for RF communications, sets the "output code" to "40h," and outputs UART data that contain, for example, 4 bytes of control data "data 1 through data 4," which correspond to the key on which the input operation for control was performed, to the RF communications module (RF transmitting circuit unit) 2 of the remote control transmitter 3 via the UART interface 5.

The communications control unit 8 of the RF communications module 2 that is operating in the initial operation mode transitions, triggered by the interrupt of the UART data, to the "pairing mode" and generates the RF packet data shown in FIG. 8. As shown in the same figure, "01h," which indicates pairing start, is assigned to the "status code" of this RF packet data, and the master ID assigned to the remote control transmitter 3 is read out from the ID storage unit 20 and assigned to the "ID code." The "transport data," which follows the "ID code," contain the abovementioned UART data, as is, and as a result the RF packet data contains the output code of "40h" along with the control data (data 1 through data 4).

The RF packet data generated by the communications control unit 8 are output to the RF communications circuit unit 9 via the SPIs 11, 10, and the DSSS modulation-demodulation unit 22 outputs the modulated signal, which has been DSSS modulated with all of the data of the RF packet into the frequency band of channel 26 in FIG. 5, to the printed antenna 7 where it is transmitted as an RF signal. Namely, in this pairing mode, only one of the channels into which the available frequency band was divided is used as the pairing channel.

Moreover, when the RF communications module (RF receiving circuit unit) 2 on the controlled apparatus 4 side is in the initial operation mode, the reception channel selection unit 21 stands by for the reception of an RF signal only on the abovementioned pairing channel (channel 26) without performing a reception scan of all transmission channels. When the reception channel selection unit 21 receives an RF signal from the printed antenna 7, the signal is DSSS demodulated by the DSSS modulation-demodulation unit 22, and then the demodulated RF packet data, which are shown in FIG. 8, are output to the communications control unit (control MPU) 8 via the SPIs 10, 11. The communications control unit 8 that operates in the initial operation mode transitions to the "pairing mode" because, as a result of the input of the RF packet data, the "status code" of the RF packet data is "01h," which indicates pairing start.

The communications control unit 8 of the RF communications module 2, which transitioned to the "pairing mode," stores the master ID, which is contained in the ID code of the RF packet data that was input, in the ID storage unit 20 as the ID code of the communication counterpart, generates RF packet data, as shown in FIG. 7, that indicate a pairing response, and transmits an RF signal, which is spread spectrum modulated into the frequency band of the pairing channel by the DSSS modulation-demodulation unit 22, via the printed antenna 7. The "status code" of the RF packet data that indicates this pairing response is assigned "06h", which indicates "pairing ACK," and the slave ID that is assigned to the controlled apparatus 4 is read out from the ID storage unit 20 and assigned to the "ID code". The "transport data" that follows the "ID code" contain the previously discussed master ID, which was received from the remote control transmitter 3 and stored in the relevant ID storage unit 20.

In addition, because the "output code" is "40h," the communications control unit 8 outputs the UART data portion of the RF packet data, as is, from the UART interface 5 to the input port of the controlled apparatus MPU 13 as bit stream transmit data (TxD), as shown in FIG. 8. The controlled apparatus MPU 13 uses the built-in UART to convert the UART data to parallel data, which are handled by the bus lines, and controls the controlled apparatus 4 in accordance with the control data (data 1 to data 4) contained in the UART data.

The RF communications module (RF transmitting circuit unit) 2 of the controlled apparatus 4 that transmitted the pairing ACK RF signal transitions to the normal operation mode and terminates the initial operation mode.

In addition, the RF communications module 2 of the remote control transmitter 3 that transmitted the pairing start RF signal serves as the RF receiving circuit unit, wherein the reception channel selection unit 21 stands by for the reception of an RF signal on the pairing channel. If the "status code" of the RF packet data that were demodulated from the RF signal that was received within a prescribed interval is "06h," which indicates "pairing ACK," and the "transport data" contain the unique ID assigned to itself, then the RF communications module 2 of the remote control transmitter 3 determines that the pairing ACK RF signal that was transmitted back from the controlled apparatus 4 has been received, stores the slave ID contained in the ID code of that input RF packet data in the ID storage unit 20 as the ID code of the communication counterpart, and transitions from the pairing mode to the normal operation mode. This completes the pairing process that specifies the pair that comprises the remote control transmitter 3 and the controlled apparatus 4.

In addition, because this pairing process is performed without the operator's knowledge by a procedure wherein the operator performs an input operation on the remote control transmitter 3 to remotely control the controlled apparatus 4, it does not become a burden to the operator.

The scope of the present invention is not limited to the embodiments described above. In at least one embodiment discussed above, the reception channel selected by the reception channel selection unit 21 of the controlled apparatus 4 from among any one of the transmission channels was set to the channel with the lowest electric field intensity; however, if the electric field intensity of a specified channel that has been reception scanned is below a prescribed threshold value, then subsequent scanning for the remaining prescribed time may be stopped and that channel may be used as the reception channel.

In addition, all of the channels divided from the available frequency band may be used as transmission channels; furthermore, an arbitrary channel that is spaced apart from the center frequency may be used as the transmission channel. In addition, regardless of the frequency bands of the transmission channels, the transmission order of RF signals is arbitrary, e.g., the transmission of RF signals on channels 15, 20 and 25 that are hardly used in comparison by other RF communications systems may be given priority over other channels.

In addition, the format storage unit 15 and the pulse signal modulation unit 16 may each comprise a storage device, a circuit device, and the like that are separate from the control MPU 8; furthermore, the pulse signal format stored in the format storage unit 15 may be a signal format of another modulation method such as that of a PPM modulated signal.

Furthermore, the pairing channel used in the pairing mode was explained using an example wherein the pairing channel is set to a prescribed specified channel in advance; however, the pairing channel on the remote control transmitter 3 side may be set to a channel that has a low electric field intensity, and the RF communications module on the controlled apparatus 4 side may perform a reception scan on all channels in the available frequency band and receive an RF signal that indicates pairing start.

In additional to each of the above-described embodiments of the present invention, it is intended that the scope of the present invention include all foreseeable equivalents to elements of the above-described embodiments.

The invention claimed is:

1. An RF communications system, comprising:
a remote control transmitter that includes:
a remote control side control unit that generates control data for controlling operation of an apparatus in accordance with an input operation and
an RF transmitting circuit unit that generates RF packet data which contain the control data generated by the remote control side control unit and that transmits an RF signal that is modulated with the RF packet data via a transmitter antenna; and
a controlled apparatus that includes:
an RF receiving circuit unit that demodulates the RF packet data from the RF signal received by a receiving antenna, the RF receiving circuit unit comprising:
a pulse signal modulation unit that modulates a pulse modulated signal with control data of the RF packet data and outputs the modulated RF packet data;
a format storage unit that associates a pulse modulated signal format, with which each apparatus side control unit of a plurality of controlled apparatuses can demodulate the control data from the pulse modulated signal, with an output code therefor, and stores them;
a pulse modulation signal output interface; and
a UART (universal asynchronous receiver transmitter) interface; and
an apparatus side control unit that receives the modulated RF packet data from the pulse signal modulation unit, demodulates the modulated RF packet data to obtain control data from the modulated RF packet data, and controls the operation of each unit based on the control data that are contained in the modulated RF packet data;
wherein:
the apparatus side control unit is configured to extract output code data from the demodulated RF packet data and to determine whether the output code data comprises output code data in pulse modulated format or UART format;
when the output code data is in pulse modulated format output, the apparatus side control unit retrieves the pulse modulated signal format from the format storage unit, modulates the demodulated RF packet data according to the pulse modulated signal format to prepare a pulse modulated signal, and provides the pulse modulated signal to the pulse modulation signal output interface for outputting; and
when the output code data is in the UART output format, the apparatus side control unit prepares the demodulated RF packet data as serial data and provides the serial data to the UART interface for outputting.

2. The RF communications system according to claim 1, wherein
the RF transmitting circuit unit of the remote control transmitter includes the output code that specifies the pulse modulated signal format, with which the apparatus side control unit of the controlled apparatus that is remotely controlled via RF signal is capable of demodulation, in the RF packet data together with the control data.

3. The RF communications system according to claim 1, wherein
the RF transmitting circuit unit:
divides a wireless frequency band, in which the RF transmitting circuit unit can transmit RF signals and the RF receiving circuit unit can receive RF signals, into a plurality of divided channels; and
transmits RF signals on any one of the divided channels;

the RF receiving circuit unit:
stands by for reception of the RF signal on a channel that is identical to the divided channel on which the RF transmitting circuit unit transmitted the RF signal; and
receives the RF signal transmitted by the RF transmitting circuit unit;
the RF transmitting circuit unit selects all or two or more selected channels of the channels divided from the wireless frequency band as transmission channels, and, for each of the transmission channels, transmits RF signals that are modulated to a frequency band for each of the selected channels; and
the RF receiving circuit unit monitors the electric field intensity of all transmission channels selected by the RF transmitting circuit unit and stands by for the reception of the RF signal on one of the transmission channels that has an electric field intensity below a predetermined threshold value.

4. The RF communications system according to claim 3, wherein the RF signal is directly spread spectrum modulated with RF packet data to a frequency band for the selected channel.

5. The RF communications system according to claim 3, wherein the wireless frequency band is 2,400-2,483.5 MHz.

6. An RF communications system for a controlled apparatus, the RF communications system comprising:
an RF receiving circuit unit that demodulates RF packet data from an RF signal received by a receiving antenna from a remote control transmitter, the RF receiving circuit unit comprising:
a pulse signal modulation unit that modulates a pulse modulated signal with control data of the RF packet data and outputs the modulated RF packet data;
a format storage unit that associates a pulse modulated signal format, with which each apparatus side control unit of a plurality of controlled apparatuses can demodulate the control data from the pulse modulated signal, with an output code therefor, and stores them;
a pulse modulation signal output interface; and
a UART (universal asynchronous receiver transmitter) interface; and
an apparatus side control unit that receives the modulated RF packet data from the pulse signal modulation unit, demodulates the modulated RF packet data to obtain control data from the modulated RF packet data, and controls the operation of each unit based on the control data that are contained in the modulated RF packet data;
wherein:
the apparatus side control unit is configured to extract output code data from the demodulated RF packet data and to determine whether the output code data comprises output code data in pulse modulated format or UART format;
when the output code data is in pulse modulated format output, the apparatus side control unit retrieves the pulse modulated signal format from the format storage unit, modulates the demodulated RF packet data according to the pulse modulated signal format to prepare a pulse modulated signal, and provides the pulse modulated signal to the pulse modulation signal output interface for outputting; and
when the output code data is in the UART output format, the apparatus side control unit prepares the demodulated RF packet data as serial data and provides the serial data to the UART interface for outputting.

* * * * *